(12) United States Patent
Leen et al.

(10) Patent No.: US 8,740,101 B2
(45) Date of Patent: *Jun. 3, 2014

(54) BACKUP CONTROL FOR HVAC SYSTEM

(75) Inventors: Cary Leen, Hammond, WI (US);
Gabriel A. Bergman, Minneapolis, MN (US); Jiri Frint, Lukavice (CZ); James Grenkoski, Apopka, FL (US)

(73) Assignee: Honeywell International Inc., Morristown, NJ (US)

( * ) Notice: Subject to any disclaimer, the term of this patent is extended or adjusted under 35 U.S.C. 154(b) by 378 days.

This patent is subject to a terminal disclaimer.

(21) Appl. No.: 13/035,068

(22) Filed: Feb. 25, 2011

(65) Prior Publication Data

US 2011/0137467 A1  Jun. 9, 2011

Related U.S. Application Data

(63) Continuation of application No. 12/171,181, filed on Jul. 10, 2008, now Pat. No. 7,992,794.

(51) Int. Cl.
*G05D 23/00* (2006.01)

(52) U.S. Cl.
USPC .............................. 236/51; 236/94; 700/276

(58) Field of Classification Search
USPC .................. 236/51, 94; 700/276; 62/126
See application file for complete search history.

(56) References Cited

U.S. PATENT DOCUMENTS

| | | | |
|---|---|---|---|
| 4,829,779 A | 5/1989 | Munson et al. |
| 5,801,940 A | 9/1998 | Russ et al. |
| 6,619,055 B1 | 9/2003 | Addy |
| 6,622,925 B2 | 9/2003 | Carner et al. |
| 7,133,748 B2 | 11/2006 | Robinson |
| 7,574,283 B2 | 8/2009 | Wang et al. |
| 2003/0040279 A1 | 2/2003 | Ballweg |
| 2003/0066897 A1 | 4/2003 | Carner et al. |
| 2006/0112700 A1 | 6/2006 | Choi et al. |
| 2007/0119961 A1 | 5/2007 | Kaiser |
| 2007/0182594 A1 | 8/2007 | Face et al. |
| 2007/0241203 A1 | 10/2007 | Wagner et al. |
| 2007/0290924 A1 | 12/2007 | McCoy |

*Primary Examiner* — Marc Norman
(74) *Attorney, Agent, or Firm* — Seager, Tufte, Wickhem LLC

(57) ABSTRACT

An equipment interface module that can operate one or more pieces of HVAC equipment in accordance with instructions received from a properly operating thermostat, yet can also operate the HVAC equipment when communications between the thermostat and the HVAC controller are lost due to, for example, low battery power at the thermostat, malfunctioning thermostat sensor(s), malfunctioning communication and/or thermostat circuitry, electrical interference, and the like. In some instances, the equipment interface module may regulate the HVAC equipment in accordance with a signal from a remote sensor when communication with the thermostat is lost.

20 Claims, 4 Drawing Sheets

BACKUP CONTROL FOR HVAC SYSTEM

This application is a continuation of U.S. patent application Ser. No. 12/171,181, filed Jul. 10, 2008, and entitled "BACKUP CONTROL FOR HVAC SYSTEM", which is hereby incorporated by reference.

TECHNICAL FIELD

The disclosure relates generally to HVAC systems, and more particularly to HVAC systems that employ remotely located thermostats.

BACKGROUND

Many residential and commercial buildings include one or more remotely located thermostats for controlling the HVAC equipment used to heat, cool, control humidity, and/or ventilate the building. The thermostat typically monitors air temperature and/or other parameters within the building, and provides appropriate instructions to the HVAC equipment in order to control selected environmental parameters such as temperature and/or humidity within the building space.

Some thermostats are powered by electrical lines that extend between the thermostat and the HVAC equipment. Other thermostats rely on one or more batteries disposed within the thermostat to power the thermostat. Some thermostats have wired connections to the HVAC equipment, while others communicate with the HVAC equipment over a wireless connection.

It will be appreciated that when a thermostat loses power (e.g. via a battery failure) and/or loses communication with HVAC equipment (e.g. via battery failure and/or wireless connection failure), the thermostat will cease to provide the desired instructions to the HVAC equipment. This may cause conditions within the building to fall outside of desired environmental parameter levels. For example, if during a hot day, the thermostat ceases to provide the desired instructions to the HVAC equipment, the building interior may become excessively hot and/or humid. This may be problematic, particularly for people having increased sensitivity to heat. Also, excessive humidity, which if allowed to persist for a sufficient period of time, can cause mold and/or other damage to the building. Similarly, if during a cold day, the thermostat ceases to provide the desired instructions to the HVAC equipment, the building interior may become excessively cold, which under some circumstances, may cause pipes to freeze and/or cause other damage to the building.

A need exists, therefore, for an HVAC controller that can operate one or more pieces of HVAC equipment in accordance with instructions received from a properly operating thermostat, yet can also operate the HVAC equipment when communications between the thermostat and the HVAC controller are lost due to, for example, low battery power at the thermostat, malfunctioning thermostat sensor(s), malfunctioning communication and/or thermostat circuitry, electrical interference, and the like.

SUMMARY

The disclosure pertains generally to an HVAC controller that can operate one or more pieces of HVAC equipment in accordance with instructions received from a properly operating thermostat, yet can also operate the HVAC equipment when communications between the thermostat and the HVAC controller are lost due to, for example, low battery power at the thermostat, malfunctioning thermostat sensor(s), malfunctioning communication and/or thermostat circuitry, electrical interference, and the like.

An illustrative but non-limiting example of may be found in an HVAC system that includes an HVAC component having an HVAC controller, a remotely located wireless thermostat, and an equipment interface module that is in communication with the wireless thermostat. In some cases, the equipment interface module may be configured to provide instructions to the HVAC component in accordance with and/or in response to instructions received from a properly operating thermostat. The equipment interface module may also be configured to provide instructions to the HVAC component if/when the equipment interface module loses communication with the wireless thermostat.

Another illustrative but non-limiting example of the disclosure may be found in a method of operating an HVAC system that includes an HVAC component and an HVAC controller, a wireless thermostat, an equipment interface module disposed exterior to the HVAC component, and a remote sensor. The HVAC component may be operated in accordance with instructions received from the wireless thermostat. If communication between the wireless thermostat and the equipment interface module fails, the HVAC component may be controlled via the equipment interface module and the remote sensor until communication is restored.

Another illustrative but non-limiting example of the disclosure may be found in an equipment interface module that is configured to communicate with a wireless thermostat and a remote sensor and is configured to control an HVAC component that includes a circulating blower. In some cases, the equipment interface module may include an RF transceiver and a controller. The controller may be configured to recognize if/when communication between the wireless thermostat and the equipment interface module is lost, start the circulating blower when communication is lost, and operate the HVAC component in accordance with a signal from the remote sensor until communication between the wireless thermostat and the equipment interface module is restored. In some cases, the remote sensor may be positioned in fluid communication with the return air duct of the building, but this is not required.

The preceding summary is provided to facilitate an understanding of some of the features unique to the present invention and is not intended to be a full description. A full appreciation of the invention can be gained by taking the entire specification, claims, drawings, and abstract as a whole.

BRIEF DESCRIPTION

The disclosure may be more completely understood in consideration of the following detailed description of various embodiments in connection with the accompanying drawings, in which.

Figure 1:
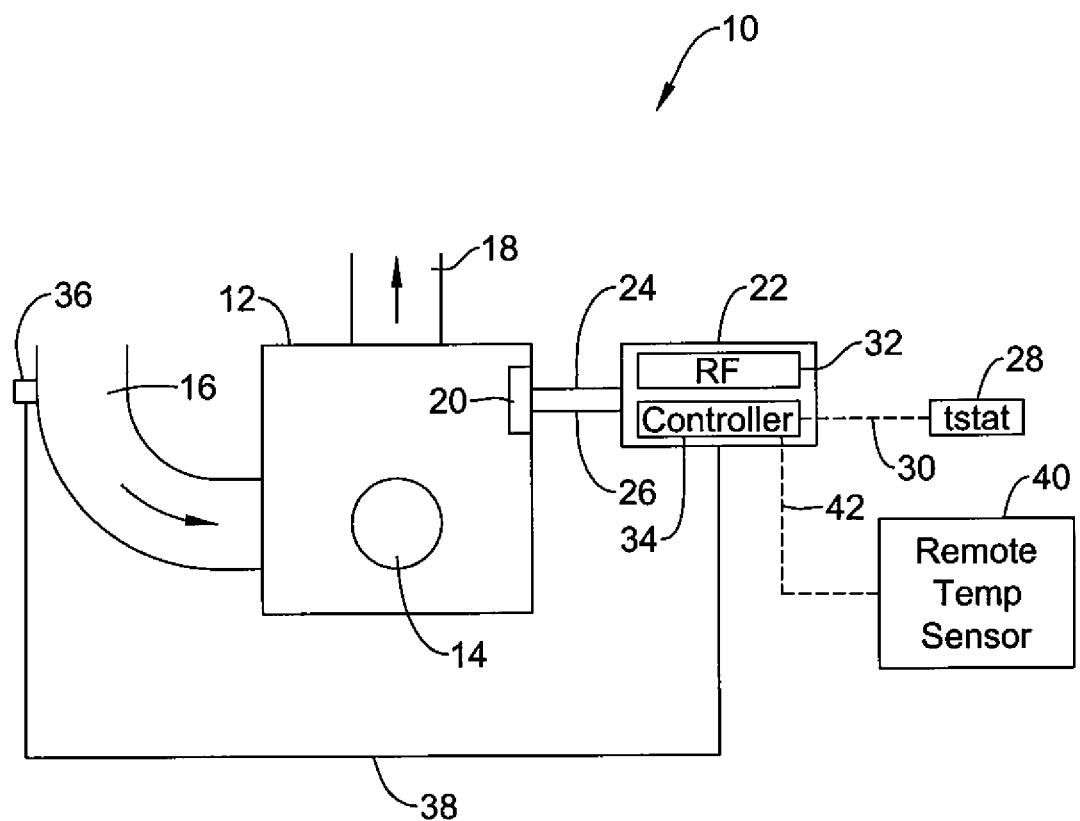
FIG. 1 is an illustrative but non-limiting example of an HVAC system that employs a remotely located thermostat.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

FIG. 1 is a schematic illustration of an HVAC system 10 that includes an HVAC component 12. HVAC component 12 may, for example, be a forced air furnace and/or an air conditioning unit, although any suitable HVAC component may be used. In some instances, HVAC component 12 may include a circulating air blower 14 that pulls return air into HVAC component 12 via a return air duct 16 and subsequently blows conditioned air back into the building via a conditioned air duct 18.

While not illustrated, it will be appreciated that HVAC component 12 may include a heating apparatus that includes a burner, a gas valve providing fuel to the burner, a heat exchanger and a collector box. A combustion blower may pull combustion air through the heating apparatus and exhaust the combustion gases through an exhaust flue. Alternatively, or in addition, HVAC component 12 may include an air conditioning coil. Circulating air blower 14 may blow return air across the air conditioning coil in order to cool and dry the air before the air returns to the house via conditioned air duct 18. It should be recognized that these are only illustrative HVAC components.

In some instances, HVAC component 12 may include an HVAC component controller 20. HVAC component controller 20 may, in some instances, control one or more HVAC components. For example, HVAC component controller 20 may be an integrated furnace controller that is configured to control various components of HVAC system 10, such as the ignition of fuel by an ignition element (not shown), the speed and operation times of the aforementioned combustion blower, the speed and operation times of circulating air blower 14 and/or the activation and deactivation of an air conditioner coil. Alternatively, or in addition, HVAC component controller 20 can be configured to monitor and/or control various other aspects of the HVAC system 10 including any damper and/or diverter valves connected to the supply air ducts, any sensors used for detecting temperature and/or airflow, any sensors used for detecting filter capacity, and any shut-off valves used for shutting off the supply of gas to the gas valve. This is only illustrative.

In some cases, HVAC component controller 20 may be configured to receive electrical signals from one or more remotely located thermostats that monitor temperature and perhaps other HVAC system parameters such as humidity within a building. However, in some instances, HVAC component controller 20 may instead be electrically connected to, or integral with, a controller such as an equipment interface module 22. While two electrical lines 24, 26 are shown, it will be appreciated that this is only illustrative of a communications path. In some cases, there may be more or less than two electrical lines connecting HVAC component controller 20 and equipment interface module 22. In some cases, it is contemplated that equipment interface module 22 may communicate wirelessly with HVAC component controller 20.

Equipment interface module 22 may communicate with a thermostat 28, as shown. In some cases, thermostat 28 may be hard-wired to equipment interface module 22 via an electrical connection 30. In some instances, the thermostat 28 may be battery powered, and may not draw any power from the electrical connection 30, either parasitically or via a dedicated power line, from HVAC component 12. In such instances, the electrical connection 30 may be used by the thermostat 28 to send instructions to the equipment interface module 22.

In some case, thermostat 28 may be a wireless thermostat that is configured to communicate wirelessly with equipment interface module 22. When so provided, the thermostat may be solely battery powered, or may receive power from electrical connection 30, as desired. In either case, equipment interface module 22 may include a wireless communications system 32 as well as a controller 34. In some cases, wireless communications system 32 may be an RF (radio frequency) wireless communications system, but it is contemplated that any suitable wireless communication path may be used, as desired. In some instances, the equipment interface module 22 may include an RF receiver and the wireless thermostat may include an RF transmitter. One or two-way communication may be provided, as desired.

Controller 34 may be configured to provide appropriate instructions to HVAC component controller 20 in response to calls for heating and/or cooling that may originate from thermostat 28. While not expressly illustrated, controller 34 may include memory that may be used to store programming as well as a processor that may carry out the programming instructions.

It will be appreciated that in some instances, communication between equipment interface module 22 and thermostat 28 may be interrupted for any number of reasons. For example, communication between equipment interface module 22 and thermostat 28 may be interrupted because of low battery power at the thermostat 28, malfunctioning thermostat sensor(s), malfunctioning communication and/or thermostat circuitry, electrical interference, and the like.

In some cases, equipment interface module 22 may be programmed to operate HVAC component 12 in the absence of any communication between equipment interface module 22 and thermostat 28. In some instances, HVAC system 10 may include one or more remote sensors that can, if desired, provide appropriate signals to equipment interface module 22 so that equipment interface module 22 can reasonably regulate air temperature and/or other parameters such as humidity within a building. That is, equipment interface module 22 may provide backup control to the HVAC system 10 when communication between the equipment interface module 22 and the thermostat 28 is interrupted for any number of reasons.

In some instances, HVAC system 10 may include a return air sensor 36 that can be configured to provide equipment interface module 22, via electrical (or wireless) connection 38, with information pertaining to environmental conditions within the building. Return air sensor 36 may be a temperature sensor and/or a humidity sensor. In some cases, equipment interface module 22 may be configured to accept other remote temperature signals. For example, HVAC system 10 may include a remote temperature sensor 40 that can be a temperature sensor that is located somewhere in the building and that can provide a signal to equipment interface module 22 via a wired or wireless connection 42. In some cases, remote temperature sensor 40 may be an outdoor air temperature sensor.

In some cases, remote temperature sensor 40 may represent a temperature sensor disposed within a remote control for thermostat 28. In some cases, particularly if HVAC system 10 is located within a zoned building having two or more thermostats (not illustrated), it is contemplated that remote temperature sensor 40 may represent a working thermostat that can provide a temperature signal to equipment interface module 22 when one or more of the other thermostats within the system have stopped working or at least have stopped communicating with equipment interface module 22.

As noted above, equipment interface module 22 may, in response to calls for heat and/or cooling from thermostat 28, provide appropriate instructions to HVAC component controller 20. Equipment interface module 22 may be programmed to check for a signal from thermostat 28. If equipment interface module 22 does not receive a signal from thermostat 28, over a predetermined length of time, equipment interface module 22 may determine that communication between equipment interface module 22 and thermostat 28 has been at least temporarily lost. In some cases, equipment interface module 22 may be configured to ping thermostat 28 in accordance with a particular schedule, or perhaps only when no signals have been received by equipment interface module 22.

In any event, once equipment interface module 22 has determined that communication has at least temporally been lost, equipment interface module 22 may step in and provide appropriate instructions to HVAC component controller 20, even without input from thermostat 28. In an illustrative but non-limiting example, equipment interface module 22 may operate HVAC component 12 in accordance with a sensor signal from return air sensor 36 and/or remote temperature sensor 40. In some cases, particularly if equipment interface module 22 is relying on a signal from return air sensor 36, equipment interface module 22 may instruct HVAC component controller 20 to operate circulating air blower 14 continuously for a period of time to move house air past return air sensor 36 so that a more representative temperature (or other parameter) may be obtained.

In some instances, equipment interface module 22 may provide signals for heating or cooling to HVAC component controller 20 in order to maintain building air temperature (as indicated by return air sensor 36) at a predetermined set point. In some instances, equipment interface module 22 may maintain building air temperature in accordance with the most recent temperature set point used by thermostat 28. In some cases, equipment interface module 22 may maintain the building air temperature at a level that is safe, but is sufficiently moved from a previous set point so that the building occupants may sense that something is not correct, and may check thermostat 28. In some instances, equipment interface module 22 may maintain the building air temperature at a set point of 65° F. for heating and 80° F. for cooling, but this is illustrative only. In some cases, the equipment interface module 22 may control the building air temperature in accordance with a schedule, such as an Energy Star™ schedule. Alternatively, or in addition, humidity and/or other parameters may be similarly controlled by the equipment interface module 22, if desired.

If thermostat 28 is completely without power, it may appear dead to the user, indicating to the user that the battery may have failed. In some cases, if thermostat 28 is too low on power to provide a wireless signal to equipment interface module 22 yet retains some power, a LOW BATTERY or similar indication may be indicated by thermostat 28. If the thermostat 28 has sufficient power, but the wireless communication link has failed, the thermostat itself may provide an indication to the user that the wireless communication link has failed. In some instances, equipment interface module 22 may itself provide a visual indication that communication has failed.

In some cases, equipment interface module 22 may retain equipment configuration information that may have previously been provided by thermostat 28 or perhaps is indicated by one or more settings made by an installer. For example, HVAC component 12 may include a single stage furnace, a two stage furnace, a modulating furnace, a single stage air conditioning unit, a two stage air conditioning unit, a one, two or three stage heat pump, and the like. Similarly, thermostat 28 may be a single stage thermostat or a two-stage thermostat. Equipment interface module 22 may store this information in a non-volatile memory, and then provide the appropriate instructions to properly operate HVAC component 12 via a sometimes simplified control algorithm.

In one example, if HVAC component 12 has more than one heating stage, equipment interface module 22 may track how fast the building air temperature (as indicated by remote air sensor 36) is changing in response to equipment interface module 22 turning on first stage heat. If the temperature is changing too slowly, equipment interface module 22 may instruct HVAC component controller 20 to activate second stage heat. Once the building temperature approaches the desired temperature, equipment interface module 22 may first stop second stage heat and then subsequently stop first stage heat once the desired temperature has been achieved. In some instances, equipment interface module 22 may instead activate first stage heat, second stage heat and/or even an additional heat stage, auxiliary heat or emergency heat based upon a temperature difference between a set point and a temperature detected by return air sensor 36.

Figure 2:
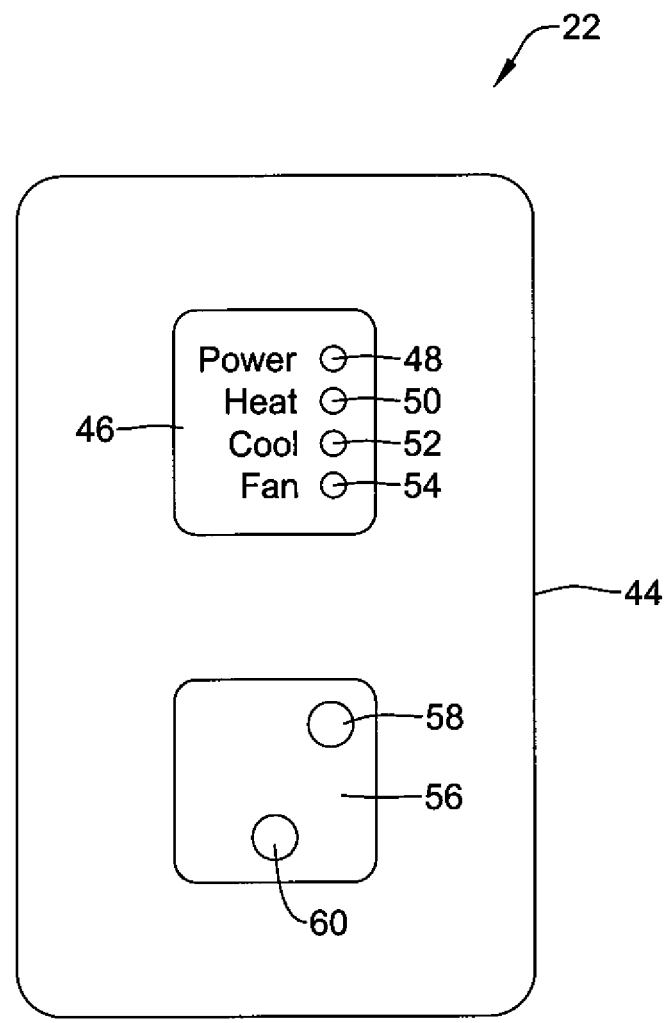
FIG. 2 is an illustrative but non-limiting example of an equipment interface module that may be used within the HVAC system of FIG. 1.

FIG. 2 is a schematic front view of an illustrative equipment interface module 22. The illustrative equipment interface module 22 has a housing 44. It will be appreciated that housing 44 may be configured to accommodate appropriate wiring connections between equipment interface module 22 and HVAC component controller 20 (FIG. 1), such as electrical connections 24 and 26 (FIG. 1). Appropriate wiring connections may be made along a side or a rear surface of housing 44. In some cases, a portion of the front of housing 44 may be hinged to provide necessary access to a wiring block. This is just one illustrative embodiment. In some instances, the equipment interface module 22 may be integrated with the HVAC component controller 20, but this is not required.

In an illustrative but non-limiting example, equipment interface module 22 may include a system status board 46 that may include one or more LEDs (light emitting diodes) that can light to show system status. Examples of lights that may be included within system status board 46 include a POWER light 48, a HEAT light 50, a COOL light 52 and/or a FAN light 54 that may light as appropriate to show current system status. It is contemplated that additional system status lights may be included, as desired and/or appropriate given the particulars of HVAC system 10 (FIG. 1).

Equipment interface module 22 may, in some cases, include a wireless status board 56. Wireless status board 56 may include a connection button 58 that may be used to establish wireless communication with a thermostat 28 (FIG. 1) and/or any other wireless devices within HVAC system 10. Wireless status board 56 may include a wireless status light 60 that provides an indication of current communications status. For example, wireless status light 60 may be an LED that glows green when communication is established, and glows red when communication has failed. In some instances, wireless status light 60 may blink green while in the process of attempting to establish wireless communication with thermostat 28 and/or another wireless device, but this is not required.

Figure 3:
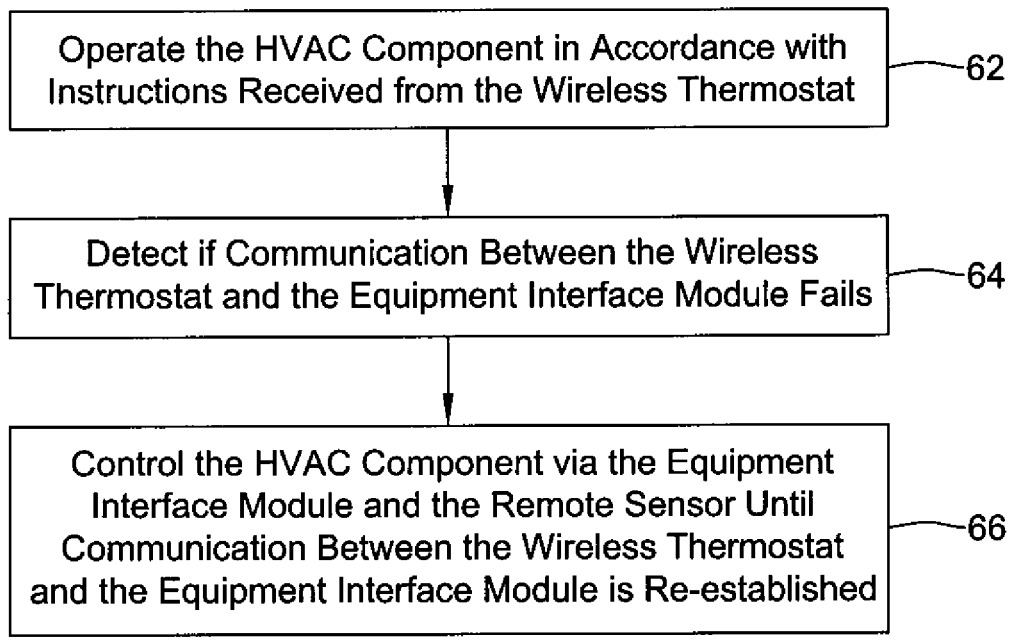
FIGS. 3-4 are flow diagrams showing some illustrative but non-limiting examples of methods that may be carried out using the HVAC system of FIG. 1.

FIG. 3 is a flow diagram showing an illustrative but non-limiting example of a method that may be carried out via HVAC system 10 (FIG. 1). Control begins at block 62, where an HVAC component such as HVAC component 12 (FIG. 1) is operated in accordance with instructions received from a wireless thermostat such as thermostat 28 (FIG. 1). At 64, equipment interface 22 (FIG. 1) detects if communication between the wireless thermostat and the equipment interface module 22 has failed.

If communication has failed, control passes to block 66 where HVAC component 12 (FIG. 1) is controlled via equipment interface module 22 and a remote sensor such as a return air sensor 36 (FIG. 1) and/or remote temperature sensor 40 (FIG. 1) until communication between equipment interface module 22 and the wireless thermostat is reestablished. In some instances, the remote sensor is used to detect a system parameter such a temperature and/or humidity, and HVAC component 12 is operated to maintain a predetermined value for the system parameter.

Figure 4:
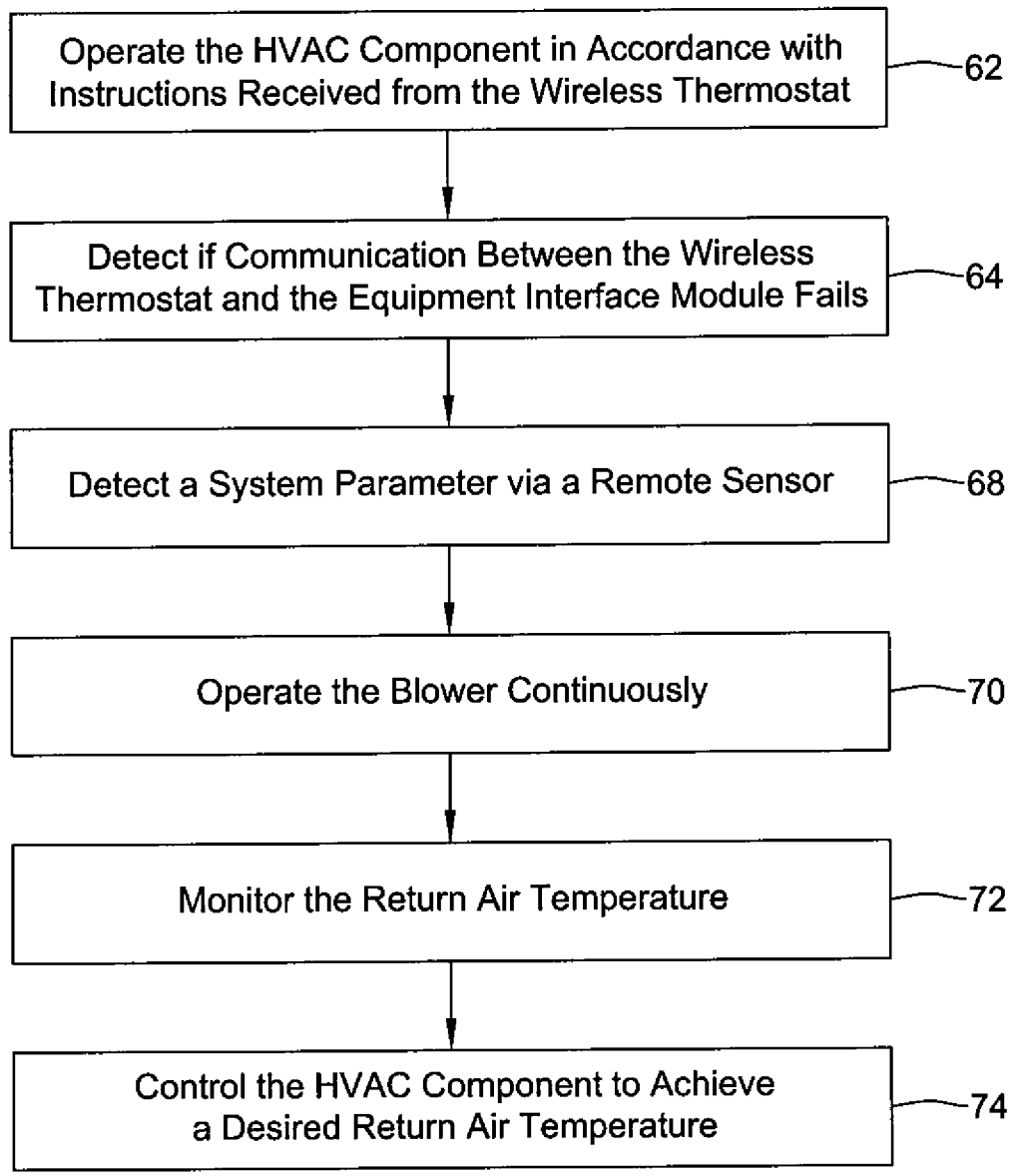

FIG. 4 is a flow diagram showing an illustrative but non-limiting example of a method that may be carried out via HVAC system 10 (FIG. 1). Control begins at block 62, where an HVAC component such as HVAC component 12 (FIG. 1) is operated in accordance with instructions received from a wireless thermostat such as thermostat 28 (FIG. 1). At 64, equipment interface 22 (FIG. 1) detects if communication between the wireless thermostat and the equipment interface module 22 has failed.

If communication has failed, control passes to block 68, where a system parameter such as air temperature (and/or humidity) is detected via a remote sensor such as remote air sensor 36 (FIG. 1). As seen at block 70, the circulating air blower 14 (FIG. 1) may be then be operated continuously so that remote air sensor 36 provides a more accurate representation of conditions within the building. Equipment interface module 22 monitors the return air temperature as seen at block 72, and then controls HVAC component 12 (FIG. 1) to attain and then maintain a desired return air temperature.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. An equipment interface module configured to communicate with a wireless thermostat and a temperature sensor, the equipment interface module also configured to provide instructions to an HVAC system to affect the temperature of an inside space of a building, the equipment interface module comprising:
a sensor input port for receiving an output signal from a temperature sensor;
a wireless receiver for receiving wireless signals from a wireless thermostat, wherein the wireless thermostat is located remotely from the equipment interface module;
a controller in communication with the sensor input port and the wireless receiver, the controller programmed to determine if the equipment interface module loses communication with the wireless thermostat, and if not, provides instructions to the HVAC system in accordance with and in response to the wireless signals received from the wireless thermostat, and if so, provides instructions to the HVAC system without input from the wireless thermostat but in accordance with and in response to the output signal from the temperature sensor.

2. The equipment interface module of claim 1, wherein the temperature sensor is wired to the sensor input port of the equipment interface module.

3. The equipment interface module of claim 1, wherein the temperature sensor is a return air sensor disposed in a return air duct of the HVAC system.

4. The equipment interface module of claim 1, wherein the controller provides instructions to the HVAC system in accordance with and in response to the wireless signals received from the wireless thermostat if the equipment interface module regains communication with the wireless thermostat.

5. The equipment interface module of claim 1 further comprising a memory for storing one or more temperature set points, wherein if the equipment interface module loses communication with the wireless thermostat, the controller provides instructions to the HVAC system to maintain a temperature at the temperature sensor that is related to one of the set points.

6. The equipment interface module of claim 1, wherein the HVAC system includes a furnace that has an integrated furnace controller, and wherein the equipment interface module is mountable separate from the integrated furnace controller.

7. The equipment interface module of claim 6 further comprising one or more terminals in communication with the controller for electrically connecting the controller of the equipment interface module to the integrated furnace controller via one or more wires.

8. The equipment interface module of claim 1, wherein the HVAC system includes a furnace that has an integrated furnace controller, and wherein the equipment interface module is integrated with the integrated furnace controller.

9. An HVAC system comprising:
an HVAC component having an HVAC controller;
a remotely located wireless thermostat;
an equipment interface module in wireless communication with the wireless thermostat and in wired communication with the HVAC controller, the equipment interface module is configured to provide instructions to the HVAC controller in accordance with and in response to signals received from the wireless thermostat; and
wherein the equipment interface module is also configured to provide instructions to the HVAC controller without input from the thermostat if the equipment interface module loses communication with the wireless thermostat.

10. The HVAC system of claim 9, further comprising a sensor that is in communication with the equipment interface module, the sensor providing the equipment interface module with a control signal related to an environmental parameter within a building.

11. The HVAC system of claim 10, wherein the sensor is wired to the equipment interface module.

12. The HVAC system of claim 10, wherein the sensor comprises a return air temperature sensor.

13. The HVAC system of claim 9, wherein the equipment interface module operates the HVAC component in accordance with a predetermined temperature setpoint after communication is lost between the equipment interface module and the wireless thermostat.

14. A method of operating an HVAC system having an HVAC component and an HVAC controller, an equipment interface module in wired communication with the HVAC component, a wireless thermostat in wireless communication with the equipment interface module, and a sensor in communication with the equipment interface module, the method comprising:

controlling the HVAC component using the equipment interface module in accordance with signals provided by the wireless thermostat;

determining if transmission of valid signals between the wireless thermostat and the equipment interface module has failed; and if it is determined that transmission of valid signals between the wireless thermostat and the equipment interface module has failed, controlling the HVAC component using the equipment interface module and the sensor until it is determined that transmission of valid signals between the wireless thermostat and the equipment interface module has been reestablished.

15. The method of claim 14, wherein if it is determined that transmission of valid signals between the wireless thermostat and the equipment interface module has been reestablished, returning to controlling the HVAC component using the equipment interface module in accordance with signals provided by the wireless thermostat.

16. The method of claim 14, wherein the sensor is wired to the equipment interface module.

17. The method of claim 14, wherein controlling the HVAC component using the equipment interface module and the sensor includes:

monitoring an environmental condition via the sensor; and operating the HVAC component to achieve a desire environmental condition at the sensor.

18. The method of claim 17, wherein the desired environmental condition corresponds to a predetermined set point.

19. The method of claim 18, wherein the predetermined set point is a predetermined temperature set point.

20. The method of claim 18, wherein the predetermined set point is stored in the equipment interface module.

\* \* \* \* \*